(12) United States Patent
Fu

(10) Patent No.: US 12,488,419 B2
(45) Date of Patent: Dec. 2, 2025

(54) IMAGE PROCESS METHOD, DEVICE, SERVER, AND STORAGE MEDIUM

(71) Applicant: TCL CHINA STAR OPTOELECTRONICS TECHNOLOGY CO., LTD., Guangdong (CN)

(72) Inventor: Cailing Fu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/597,938

(22) PCT Filed: Jan. 10, 2022

(86) PCT No.: PCT/CN2022/071032
§ 371 (c)(1),
(2) Date: Jul. 6, 2023

(87) PCT Pub. No.: WO2023/123547
PCT Pub. Date: Jul. 6, 2023

(65) Prior Publication Data
US 2024/0037704 A1    Feb. 1, 2024

(30) Foreign Application Priority Data

Dec. 28, 2021   (CN) .................. 202111625609.4

(51) Int. Cl.
    *G06T 3/4053*   (2024.01)
    *G06T 3/4007*   (2024.01)
    (Continued)

(52) U.S. Cl.
    CPC .......... *G06T 3/4053* (2013.01); *G06T 3/4007* (2013.01); *G06T 5/20* (2013.01);
    (Continued)

(58) Field of Classification Search
    CPC ........... G06T 5/50; G06T 3/4007; G06T 5/20; G06T 5/73; G06T 2207/20221; G06T 5/70; G06T 3/4053
    See application file for complete search history.

(56) References Cited

U.S. PATENT DOCUMENTS

| 2001/0022622 A1* | 9/2001 | Eiho ..................... G06T 5/75 348/252 |
| 2010/0166334 A1* | 7/2010 | Zhang ................... G06T 3/00 382/300 |

(Continued)

FOREIGN PATENT DOCUMENTS

| CN | 200962583 Y | 10/2007 |
| CN | 103646379 A | 3/2014 |

(Continued)

OTHER PUBLICATIONS

Kuang, machine translation of CN-107123086-A (Year: 2017).*
(Continued)

*Primary Examiner* — Kee M Tung
*Assistant Examiner* — Xiaoming We
(74) *Attorney, Agent, or Firm* — PV IP PC; Wei Te Chung

(57) ABSTRACT

The present application provides an image process method, a device, a server, and a storage medium. Performing different processes to an enlarged image and then fusing a plurality of images after the different processes make the initial image experience multiple processes, which effectively mitigates sawtooth and artifacts phenomenon in the image while improving clarity of the image.

20 Claims, 7 Drawing Sheets

(51) Int. Cl.
*G06T 5/20* (2006.01)
*G06T 5/50* (2006.01)
*G06T 5/73* (2024.01)

(52) U.S. Cl.
CPC .................. *G06T 5/50* (2013.01); *G06T 5/73* (2024.01); *G06T 2207/20221* (2013.01)

(56) References Cited

U.S. PATENT DOCUMENTS

2015/0348234 A1 12/2015 Peng et al.
2017/0169551 A1 6/2017 Yang et al.

FOREIGN PATENT DOCUMENTS

| CN | 107123086 A | * | 9/2017 | ........... G06T 3/4007 |
|---|---|---|---|---|
| CN | 108701235 A | | 10/2018 | |

OTHER PUBLICATIONS

Lang et al. "Adaptive Edge Detection Method Based on Canny Operator", Advanced Materials Research Online: May 31, 2011 ISSN: 1662-8985, vols. 255-260, pp. 2037-2041, doi: 10.4028/www.scientific.net/AMR.255-260.2037 © 2011 Trans Tech Publications, Switzerland (Year: 2011).*
International Search Report in International application No. PCT/CN2022/071032, mailed on Oct. 8, 2022.
Written Opinion of the International Searching Authority in International application No. PCT/CN2022/071032, mailed on Aug. 10, 2022.
Chinese Office Action issued in corresponding Chinese Patent Application No. 202111625609.4 dated Oct. 31, 2024, pp. 1-11.

* cited by examiner

IMAGE PROCESS METHOD, DEVICE, SERVER, AND STORAGE MEDIUM

FIELD OF INVENTION

The present application relates to a field of image processing, especially to an image process method, a device, a server, and a storage medium.

BACKGROUND OF INVENTION

A conventional super resolution rebuild algorithm comprises a super resolution rebuild based on interpolation, a super resolution rebuild based on a degenerate model, and a super resolution rebuild based on learning. The conventional super resolution algorithm mainly depends on basic digital image process technologies to perform rebuild. The super resolution algorithm based on deep learning uses a super-resolution convolution neural network (SRCNN) model, enlarges an image of a low resolution first and then restores through the model by an interpolation process.

The method based on interpolation deems each pixel on an image as a point of an image plane, and employs known pixel messages to fit unknown pixel messages on the plane. Usually, the fitting is completed by a predefined transformation function or an interpolation core. Common methods based on interpolation include proximal interpolation process, bilinear interpolation process, and bicubic interpolation process.

SUMMARY OF INVENTION

Technical Issue

A method based on interpolation is easy to calculate and understand, but also has some obvious defects. First, it assumes that variation of a pixel grayscale value is a continuous and smooth process, but actually such assumption is not completely true. Second, during rebuild, a super resolution image is only calculated according to one pre-defined transformation function without consideration of a degraded degenerate model of an image, which usually results in a recovered image having blur and sawtooth phenomenon.

Technical Solution

An objective of the present application is to provide an image process method, a device, a server, and a storage medium intended to solve an issue of the conventional image process still generating sawtooth and artifacts.

In a first aspect, the embodiment of the present application provides an image process method, the method includes:
enlarging an initial image to be processed to obtain an enlarged image and calculating a gradient value and a gradient direction corresponding to the enlarged image;
segmentally anti-aliasing filtering the enlarged image according to the gradient direction to obtain an initial anti-aliasing filtered image;
sharpening the enlarged image to obtain an initial sharpened image; and
fusing the initial sharpened image and the initial anti-aliasing filtered image to obtain a processed target image corresponding to the initial image.

In a possible embodiment, the step of enlarging the initial image to be processed to obtain the enlarged image and calculating the gradient value and the gradient direction corresponding to the enlarged image, includes:
enlarging the initial image by a bicubic linear interpolation algorithm to obtain the enlarged image; and
calculating a gradient value of the enlarged image by a predetermined gradient operator and calculating a gradient direction of the enlarged image.

In a possible embodiment, the step of calculating the gradient value of the enlarged image by the predetermined gradient operator and calculating the gradient direction of the enlarged image, includes:
calculating a horizontal gradient value of the enlarged image by a predetermined first gradient operator;
calculating a vertical gradient value of the enlarged image by a predetermined second gradient operator; and
calculating and obtaining the gradient value of the enlarged image and the gradient direction of the enlarged image according to the horizontal gradient value and the vertical gradient value.

In a possible embodiment, the step of calculating and obtaining the gradient direction of the enlarged image according to the horizontal gradient value and the vertical gradient value, includes:
solving a ratio of the horizontal gradient value to the vertical gradient value by a tangent or arctangent function, wherein a solving result is an angle corresponding to a gradient; and
determining the gradient direction according to the angle.

In a possible embodiment, the step of segmentally anti-aliasing filtering the enlarged image according to the gradient direction to obtain the initial anti-aliasing filtered image, includes:
obtaining filtering operators corresponding to the gradient direction, and anti-aliasing filtering the enlarged image according to the filtering operators to obtain the initial anti-aliasing filtered image; and
wherein the filtering operators corresponding to the gradient direction in different angle ranges are different, and the filtering operators are plural.

In a possible embodiment, the step of sharpening the enlarged image to obtain the initial sharpened image, includes:
sharpening the enlarged image by a predetermined sharpening operator to obtain the initial sharpened image.

In a possible embodiment, the step of sharpening the enlarged image by the predetermined sharpening operator to obtain the initial sharpened image, includes:
a sharpening formula of sharpening the enlarged image by a predetermined Laplacian operator to obtain a sharpened image, which is as follows:

$$I_{lp}=I_{bc}+G_{lp}*(S_{lp}*I_{bc})$$

wherein the $G_{lp}$ is a sharpening coefficient, the $S_{lp}$ is the predetermined Laplacian operator, the $I_{bc}$ is a grayscale value corresponding to a sampling point.

In a possible embodiment, the sharpening coefficient is an adjustable value, the image process method further includes:
adjusting a value of the sharpening coefficient $G_{lp}$ to adjust a sharpening degree of the enlarged image.

In a possible embodiment, the step of fusing the initial sharpened image and the initial anti-aliasing filtered image to obtain the processed target image corresponding to the initial image, includes:
determining a first weigh corresponding to the initial anti-aliasing filtered image and a second weight corresponding to the initial sharpened image;

obtaining a target anti-aliasing filtered image according to the first weight and the initial anti-aliasing filtered image;

obtaining a target sharpened image according to the second weight and the initial sharpened image; and fusing the target anti-aliasing filtered image and the target sharpened image to obtain the target image.

In a possible embodiment, the gradient value is plural, and the step of determining the first weigh corresponding to the initial anti-aliasing filtered image and the second weight corresponding to the initial sharpened image, includes:

determining a maximum gradient value among the gradient values and determining a first gradient value threshold and a second gradient value threshold according to the maximum gradient value;

obtaining a relationship of predetermined gradient value to weight correspondence; and determining the first weight and the second weight according to the first gradient value threshold, the second gradient value threshold, and the relationship of predetermined gradient value to weight correspondence.

In a possible embodiment, the step of determining the maximum gradient value among the gradient values and determining the first gradient value threshold and the second gradient value threshold according to the maximum gradient value, includes:

$$E_{icor}=a*\max(G);$$

$$E_{ith}=b*\max(G);$$

wherein the maximum gradient value is max(G), the $E_{icor}$ is the first gradient value threshold, and the $E_{ith}$ is the second gradient value threshold.

In a second aspect, the embodiment of the present application provides an image process device, the device includes:

an enlarging module configured to enlarge an initial image to be processed to obtain an enlarged image and configured to calculate a gradient value and a gradient direction corresponding to the enlarged image;

a filter module configured to segmentally anti-aliasing filtering the enlarged image according to the gradient direction to obtain an initial anti-aliasing filtered image;

a sharpening module configured to sharpen the enlarged image to obtain an initial sharpened image; and a fusion module configured to fuse the initial sharpened image and the initial anti-aliasing filtered image to obtain a processed target image corresponding to the initial image.

In a possible embodiment, the enlarging module is configured to:

enlarge the initial image by a bicubic linear interpolation algorithm to obtain the enlarged image; and calculate a gradient value of the enlarged image by a predetermined gradient operator and calculate a gradient direction of the enlarged image.

In a possible embodiment, the enlarging module is configured to:

calculate a horizontal gradient value of the enlarged image by a predetermined first gradient operator;

calculate a vertical gradient value of the enlarged image by a predetermined second gradient operator; and calculate and obtain the gradient value of the enlarged image and the gradient direction of the enlarged image according to the horizontal gradient value and the vertical gradient value.

In a possible embodiment, the filter module is configured to: obtain filtering operators corresponding to the gradient direction, and anti-aliasing filter the enlarged image according to the filtering operators to obtain the initial anti-aliasing filtered image; and wherein the filtering operators corresponding to the gradient direction in different angle ranges are different, and the filtering operators are plural.

In a possible embodiment, wherein the sharpening module is configured to:

sharpen the enlarged image by a predetermined sharpening operator to obtain the initial sharpened image.

In a possible embodiment, the fusion module is configured to:

determine a first weigh corresponding to the initial anti-aliasing filtered image and a second weight corresponding to the initial sharpened image;

obtain a target anti-aliasing filtered image according to the first weight and the initial anti-aliasing filtered image;

obtain a target sharpened image according to the second weight and the initial sharpened image; and fuse the target anti-aliasing filtered image and the target sharpened image to obtain the target image.

In a possible embodiment, the gradient value is plural, and the fusion module is configured to:

determine a maximum gradient value among the gradient values and determine a first gradient value threshold and a second gradient value threshold according to the maximum gradient value;

obtain a relationship of predetermined gradient value to weight correspondence; and determine the first weight and the second weight according to the first gradient value threshold, the second gradient value threshold, and the relationship of predetermined gradient value to weight correspondence.

In a third aspect, the embodiment of the present application provides a server, the server includes:

at least one processor;

a memory; and at least one application program, wherein the at least one application program is stored in the memory and is configured to be implemented by the processor to perform any one of the image process methods.

In a fourth aspect, the embodiment of the present application provides a computer readable storage medium storing a computer program, wherein the computer program is loaded to a processor to implement the steps of any one of the image process methods.

Advantages

The embodiment of the present application provides an image process method, a device, server, and a storage medium, including: first, enlarging an initial image to be processed to obtain an enlarged image, and a gradient value and a gradient direction corresponding to the enlarged image is calculated; Further, segmentally anti-aliasing filtering the enlarged image according to the gradient direction to obtain an initial anti-aliasing filtered image; and sharpening the enlarged image is to obtain an initial sharpened image; finally, fusing the initial sharpened image and the initial anti-aliasing filtered image to obtain an initial image processed target image. Performing different processes to an enlarged image and then fusing a plurality of images after the different processes make the initial image experience multiple processes, which effectively mitigates sawtooth and artifacts phenomenon in the image while improving clarity of the image.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
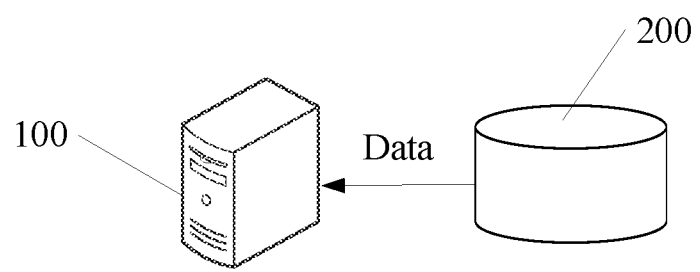
FIG. 1 is a schematic view of a scenario of an image process system provided by the embodiment of the present application.

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

In the description of the present application, it should be understood that terminologies "center", "longitudinal", "transverse", "length", "width", "thickness", "upper", "lower", "front", "rear", "left", "side", "vertical", "horizontal", "top", "bottom", "inner", "outer", "clockwise", "counterclockwise" for indicating relations of orientation or position are based on orientation or position of the accompanying drawings, are only for the purposes of facilitating description of the present application and simplifying the description instead of indicating or implying that the referred device or element must have a specific orientation or position, must to be structured and operated with the specific orientation or position. Therefore, they should not be understood as limitations to the present application. Furthermore, terminologies "first", "second" are only for the purposes of description, and cannot be understood as indication or implication of comparative importance or a number of technical features. Therefore, a feature limited with "first", "second" can expressly or implicitly include one or more features. In the description of the present application, a meaning of "a plurality of" is two or more, unless there is a clear and specific limitation otherwise.

In the present application, the word "exemplary" is used to mean "serving as an example, illustration or description". Any embodiment described as "exemplary" in the present invention is not necessarily construed as preferred or more advantageous over other embodiments. In order to enable any person skilled in the art to implement and use the present invention, the following description is given. In the following description, details are set forth for the purpose of explanation. It should be understood that a person of ordinary skill in the art will appreciate that the present invention may be implemented without the use of these specific details. In other instances, the known structures and processes are not elaborated to avoid unnecessary details from making descriptions of the present invention becomes ambiguous. Therefore, the present invention is not intended to be limited to the illustrated embodiment, but is consistent with the broadest scope of the principles and features disclosed by the present invention.

It should be explained that because the embodiment of the present application method is performed in an electronic apparatus, each process object of each electronic apparatus is in form of data or messages, for example, time is substantially time messages. It can be understood that when size, number, position, etc. are mentioned in subsequent embodiments, corresponding data exist for convenience of process of the electronic apparatus, which is not repeatedly described here.

The embodiment of the present application provides an image process method, a device, a server, and a storage medium that will be described respectively.

With reference to FIG. 1, FIG. 1 is a schematic view of a scenario of an image process system provided by the embodiment of the present application. The image process system can include an electronic apparatus 100, and the electronic apparatus 100 can be integrated with an image process device, for example the electronic apparatus as shown in FIG. 1.

In the embodiment of the present application, the electronic apparatus 100 can be an individual server, and can be a server network or a server group consisting of servers. For example, the electronic apparatus 100 described by the embodiment of the present application can include but is not limited to a computer, a network host, a single network server, a plurality of network server groups or a cloud server consisting of a plurality of servers. The cloud server consists of a huge amount of computers or network servers based on cloud computing.

A person of ordinary skill in the art can understand that an application environment shown in FIG. 1 is only one application scenario of the present application solution and is not a limit to the application scenario of the present application solution. Other application environment can further include more or less electronic apparatuses than shown in FIG. 1. For example, FIG. 1 only shows one electronic apparatus. It can be understood that the image process system can further include one or a plurality of other servers, which is not limited specifically here.

With reference to FIG. 1, the image process system can further include a storage module 200 configured to storage data.

It should be explained that the schematic view of a scenario of the image process system shown in FIG. 1 is only an example, the image process system and scenario described by the embodiment of the present application are for indicating a technical solution of the embodiment of the present application clearer, and would not constitute limits to the technical solution of the embodiment of the present application provides. A person of ordinary skill in the art can understand that with development of the image process system and emergence of new application scenarios, the technical solution provided by the embodiment of the present application is also applicable for similar technical issues.

First, the embodiment of the present application provides an image process method, an implementing body of the image process method is an image process device, the image process device is applied to an electronic apparatus, and the image process method includes:

enlarging an initial image to be processed to obtain an enlarged image and calculating a gradient value and a gradient direction corresponding to the enlarged image; segmentally anti-aliasing filtering the enlarged image according to the gradient direction to obtain an initial anti-aliasing filtered image; sharpening the enlarged image to obtain an initial sharpened image; and fusing the initial sharpened image and the initial anti-aliasing filtered image to obtain a processed target image corresponding to the initial image.

Figure 2:
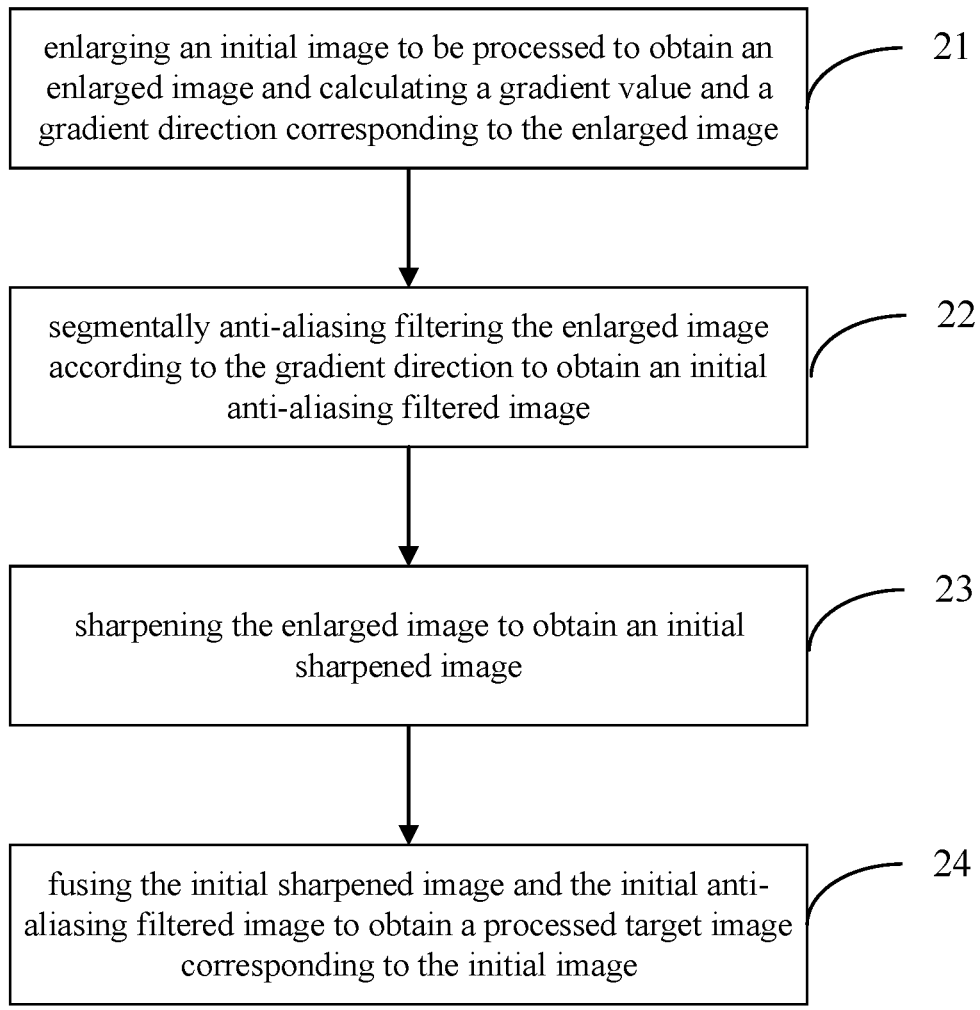
FIG. 2 is a schematic flowchart of an embodiment of an image process device provided by the embodiment of the present application.

With reference to FIG. 2, FIG. 2 is a schematic flowchart of an embodiment of an image process device provided by the embodiment of the present application, the method includes steps as follows:

A step 21 includes enlarging an initial image to be processed to obtain an enlarged image and calculating a gradient value and a gradient direction corresponding to the enlarged image.

In an embodiment of the present application, before the initial image is processed, enlarging or reducing the initial image at a certain degree is required to improve a resolution and clarity of the image for later processes.

In some embodiments, an interpolation algorithm can be used to enlarge the initial image. The interpolation algorithm is one of basic and important algorithms for image enlargement or reduction. In image enlargement or reduction, an output image pixel point coordinate probably corresponds to locations among several pixel points on an input image. At this time, a grayscale interpolation process is required to calculate a grayscale value of the output point. A quality of the interpolation algorithm also directly affects a degree of distortion of the image. Frequently used interpolation algorithms include the following three: a proximal interpolation algorithm, a bilinear interpolation algorithm, and a bicubic linear interpolation algorithm.

In an embodiment of the present application, the bicubic linear interpolation algorithm can be used to enlarge the initial image to obtain an enlarged image. Then, a predetermined gradient operator is used to calculate a gradient value of the enlarged image to obtain a gradient direction of the enlarged image.

The bicubic linear interpolation algorithm is used to enlarge the initial image, because the bicubic linear interpolation uses grayscale values of sixteen points around a point to be sampled for three interpolations, which considers not only influence of the grayscale of points directly adjacent to the sampling point, but also influence of variation rates of the grayscale values among adjacent points. The enlarged image obtained by the bicubic linear interpolation is more precise.

Specific processes of algorithm enlarging the initial image by the bicubic linear interpolation can refer to the known art and is not limited here.

A step 22 includes segmentally anti-aliasing filtering the enlarged image according to the gradient direction to obtain an initial anti-aliasing filtered image.

A step 23 includes sharpening the enlarged image to obtain an initial sharpened image.

A step 24 includes fusing the initial sharpened image and the initial anti-aliasing filtered image to obtain a processed target image corresponding to the initial image.

For the embodiment of the present application, after the initial image is enlarged to obtain an enlarged image, the enlarged image needs to be processed at different angles to obtain images processed differently, and then the processed images are fused to prevent sawtooth and artifacts generated by the image processed by a single process method.

In particular, the enlarged image can be segmentally anti-aliasing filtered according to the gradient direction of the image to obtain an anti-aliasing filtered image.

The above embodiment mainly segmentally anti-aliasing filters the enlarged image, and sharpening the enlarged image is also needed to obtain a sharpened image. Then the sharpened image and a plurality of gradient regions are fused such that a processed target image obtained is not only sharpened but also filtered, which effectively improve a precision of the target image.

It should be explained that in an embodiment of the present application, the segmentally anti-aliasing filtered image is not sharpened. Also, the sharpened image is not segmentally anti-aliasing filtered. However, the enlarged image is segmentally anti-aliasing filtered and sharpened individually, and then the segmentally anti-aliasing filtered image and the sharpened image are fused to finally obtain a processed image. As such the enlarged image is only processed one time, and the obtained image has better precision and processing effect.

The image process method provided by the embodiment of the present application includes: first, enlarging an initial image to be processed to obtain an enlarged image, and a gradient value and a gradient direction corresponding to the enlarged image is calculated; Further, segmentally anti-aliasing filtering the enlarged image according to the gradient direction to obtain an initial anti-aliasing filtered image; and sharpening the enlarged image is to obtain an initial sharpened image; finally, fusing the initial sharpened image and the initial anti-aliasing filtered image to obtain an initial image processed target image. Performing different processes to an enlarged image and then fusing a plurality of images after the different processes make the initial image experience multiple processes, which effectively mitigates sawtooth and artifacts phenomenon in the image while improving clarity of the image.

In an embodiment of the present application, the gradient value of the image refers to a variation speed of the grayscale value of the image. Because an image includes a plurality of pixels, grayscale values corresponding to any adjacent two of the pixels are different, which results in that actually each pixel in the image corresponds to a gradient value. Therefore, n calculating the gradient value and the gradient direction of the image in the embodiment of the present application actually is calculating the gradient value and the gradient direction corresponding to each pixel of the image.

Further, because the gradient is a vector, the gradient value of the image in the embodiment of the present application actually is a value corresponding to the gradient, and the gradient direction is a direction corresponding to the gradient. Namely, the gradient value and the gradient direction are specific parameters in the gradient.

Figure 3:
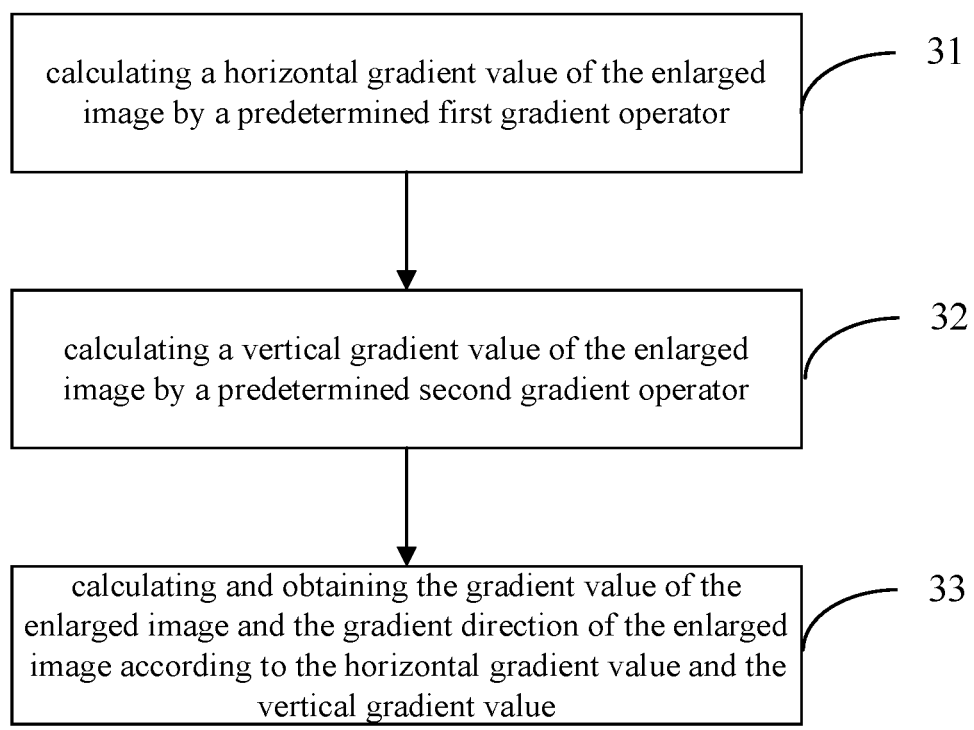
FIG. 3 is an embodiment schematic flowchart of calculating image gradient value and gradient direction provided by the embodiment of the present application.

With reference to FIG. 3, FIG. 3 is a an embodiment schematic flowchart of calculating image gradient value and gradient direction provided by the embodiment of the present application, the calculation can include:

A step 31 includes calculating a horizontal gradient value of the enlarged image by a predetermined first gradient operator.

A step 32 includes calculating a vertical gradient value of the enlarged image by a predetermined second gradient operator.

A step 33 includes calculating and obtaining the gradient value of the enlarged image and the gradient direction of the enlarged image according to the horizontal gradient value and the vertical gradient value.

In an embodiment of the present application, calculating the gradient value and the gradient direction of the enlarged image first requires to perform sampling in the enlarged image, to obtain any sampling point. Calculating the gradient value or the gradient direction of the image described in the embodiment of the present application, actually is calculating the gradient value and the gradient direction of the sampling point.

The embodiment of the present application provides different gradient operators to calculate a horizontal gradient value and a vertical gradient value corresponding to the sampling point respectively. In particular, a Sobel operator can be used to calculate the horizontal gradient value and the vertical gradient value of the sampling point. wherein first gradient operator can be:

$$S_{bx} = \begin{bmatrix} -1 & 0 & 1 \\ -2 & 0 & 2 \\ -1 & 0 & 1 \end{bmatrix}/8$$

The step of calculating the horizontal gradient value of the sampling point by the first gradient operator can be:

$G_x$ is the horizontal gradient value corresponding to the sampling point, $S_{bx}$ is the first gradient operator, $I_{bc}$ is a grayscale value corresponding to the sampling point (or the pixel value).

The second gradient operator can be:

$$S_{by} = \begin{bmatrix} -1 & 2 & 1 \\ 0 & 0 & 0 \\ -1 & -2 & -1 \end{bmatrix}/8$$

Similarly, the step of calculating the vertical gradient value of the sampling point by the second gradient operator can be:

$$G_y = S_{by} * I_{bc}$$

$G_y$ is the vertical gradient value corresponding to the sampling point, $S_{by}$ is the second gradient operator, $I_{bc}$ is the grayscale value corresponding to the sampling point (or the pixel value).

What are determined in the above embodiment are the horizontal gradient value and the vertical gradient value of the pixel, and actually the gradient value corresponding to the pixel needs to be obtained by the horizontal gradient value and the vertical gradient value. In particular, the gradient value corresponding to the pixel can be:

$$G = \sqrt{G_x^2 + G_y^2}$$

Namely, in an embodiment of the present application, first the horizontal gradient and the vertical gradient corresponding to the pixel need to be determined first, and then the gradient value corresponding to the pixel is calculated according to the horizontal gradient and the vertical gradient.

Figure 4:
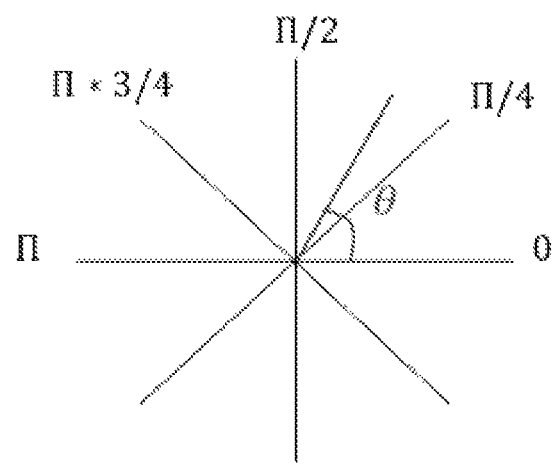
FIG. 4 is a schematic view of a gradient direction provided by the embodiment of the present application.

After the horizontal gradient value and the vertical gradient value corresponding to the sampling point is calculated and obtained, the horizontal gradient value and the vertical gradient value can be further used to calculate and obtain a gradient direction corresponding to the sampling point. In particular, the gradient direction corresponding to the sampling point can be obtained as follows:

In an embodiment of the present application, a tangent or arctangent function can be used to determine a ratio of the horizontal gradient value to the vertical gradient value, and a result is an angle corresponding to a gradient such that a gradient direction can be determined. In an embodiment of the present application, a value range of the gradient direction θ is (−π, π). With reference to FIG. 4, FIG. 4 is a schematic view of a gradient direction provided by the embodiment of the present application.

During actual processes of the image, the grayscale value (or the pixel value) corresponding to each pixel in the image is easier to determine. Therefore, a horizontal gradient value and a vertical gradient value corresponding to a pixel can be determined by a predetermined gradient operator. After determination of the horizontal gradient value and the vertical gradient value, the gradient value and the gradient direction corresponding to the pixel are further determined.

After determination of the gradient direction corresponding to the sampling point, segmentally anti-aliasing filtering the enlarged image according to gradient direction is also needed. Because the gradient direction is a direction of grayscale value increasing or decreasing fastest, segmentally anti-aliasing filtering the enlarged image based on the gradient direction can effectively mitigate or remove sawtooth in the image.

In some embodiments, it is the same to obtain filtering operators corresponding to the gradient direction to segmentally anti-aliasing filter the enlarged image according to filtering operators. However, the gradient direction in a different angle range has a different filtering operator such that the filtering operator is plural.

In particular, a formula for segmentally anti-aliasing filtering the enlarged image can be:

$$I_{AAFn} = AAF_n * I_{bc}$$

wherein $I_{AAFn}$ is a grayscale value corresponding to the filtered sampling point, and $AAF_n$ is a filtering operator provided by embodiment of the present application. Usually, the filtering operators is plural. $I_{bc}$ is an original grayscale value corresponding to the sampling point.

A range of the gradient direction in the embodiment of the present application is within (−π, π), and an absolute value of the gradient direction is required for calculation, at this time, a value range in which θ=abs(θ) becomes (0, π).

In a specific embodiment, four different filtering operators can be selected according to a range of the gradient direction θ at (0, π), and can be $AAF_1$, $AAF_2$, $AAF_3$, and $AAF_4$. Furthermore, the four different gradient operator are:

$$AAF_1 = \begin{matrix} 0 & 0 & 0 \\ [1 & 2 & 1]/4, \\ 0 & 0 & 0 \end{matrix}$$

$$\begin{matrix} 0 & 0 & 1 \end{matrix}$$

$$AAF_2 = \begin{matrix} [0 & 2 & 0]/4, \\ 1 & 0 & 0 \\ 0 & 1 & 0 \end{matrix}$$

$$AAF_3 = \begin{matrix} [0 & 2 & 0]/4, \\ 0 & 1 & 0 \\ 1 & 0 & 0 \end{matrix}$$

$$AAF_4 = \begin{matrix} [0 & 2 & 0]/4 \\ 0 & 0 & 1 \end{matrix}$$

At this time, a segmentally anti-aliasing filtering formula can be:

$$I_{AAF} = \begin{cases} (1-t_1)*I_{AAF1} + t_1*I_{AAF2} & 0 < \theta \le \pi/4, t1 = \theta/(\pi/4); \\ (1-t_2)*I_{AAF2} + t_2*I_{AAF3} & \pi/4 < \theta \le \pi/2, t2 = (\theta - \pi/4)/(\pi/4); \\ (1-t_3)*I_{AAF3} + t_3*I_{AAF4} & \pi/2 < \theta \le \pi*3/4, t3 = (\theta - \pi/2)/(\pi/4); \\ (1-t_4)*I_{AAF4} + t_4*I_{AAF1} & \pi*3/4 < \theta \le \pi, t4 = (\theta - \pi*3/4)/(\pi/4); \end{cases}$$

The gradient direction corresponding to the sampling point $\theta=abs(\theta)=\pi/4$ is taken as an example, inputting $\theta$ of $\pi/4$ into the above segmentally anti-aliasing filtering formula can obtain a result of t1=1, then $I_{AAF}=(1-1)*I_{AAF1}+ 1*I_{AAF2}=I_{AAF2}$. According to $I_{AAFn}=AAF_n*I_{bc}$, $I_{AAF2}$ can be determined to accordingly determine the grayscale value corresponding to the sampling point after segmentally anti-aliasing filter under a condition of the sampling point in which $\theta=\pi/4$.

The above embodiment mainly segmentally anti-aliasing filters the enlarged image to achieve the objective of removing sawtooth shadow of the enlarged image. The embodiment of the present application also requires sharpening the image to obtain a sharpened image, and fusing the sharpened image and the anti-aliasing filtered image.

In some embodiments, the step of sharpening the enlarged image to obtain the initial sharpened image, can include: sharpening the enlarged image by a predetermined sharpening operator to obtain the initial sharpened image.

In particular, a predetermined Laplacian operator can be used to sharpen the enlarged image to obtain the sharpened image. A sharpening formula can be:

$$I_{lp}=I_{bc}+G_{lp}*(S_{lp}*I_{bc})$$

wherein $G_{lp}$ is a sharpening coefficient, and the sharpening coefficient $G_{lp}$ is an adjustable value. An image with a different sharpening degree can be obtained by adjusting the sharpening coefficient $G_{lp}$ according to an actual sharpening condition. In an embodiment of the present application, sharpening coefficient $G_{lp}$ can be adjusted within a range (1, 4). In a specific embodiment, the sharpening coefficient $G_{lp}$ can be 2, and $S_{lp}$ is the predetermined Laplacian operator. When the Laplacian operator is determined, $S_{lp}*I_{bc}$ is also determined. The embodiment of the present application mainly adjusts the sharpened degree of the image by adjusting the sharpening coefficient $G_{lp}$. In the embodiment of the present application, the sharpening coefficient $G_{lp}$ is an adjustable value.

In the above embodiment, $I_{bc}$ is also a grayscale value corresponding to a sampling point, and the embodiment of the present application first employs the filtering operators to process the grayscale value corresponding to the sampling point, and then multiplies the value by the adjustable sharpening coefficient $G_{lp}$.

In a specific embodiment, Laplacian operator $S_{lp}$ can be:

$$S_{lp} = \begin{matrix} 0 & -1 & 0 \\ [-1 & 4 & -1]/8 \\ 0 & -1 & 0 \end{matrix}$$

It should be explained that specific values of the first gradient operator, second gradient operator, and Laplacian operator provided by the embodiment of the present application are commonly used values. In other embodiments, the first gradient operator, second gradient operator, and Laplacian operator can also be other values, which is not limited here.

The above embodiment segmentally anti-aliasing filters the enlarged image to obtain an anti-aliasing filtered image, and sharpens the enlarged image to obtain a sharpened image. The embodiment of the present application also needs to fuse the anti-aliasing filtered image and the sharpened image such that the obtained image is not only anti-aliasing filtered but also sharpened.

Figure 5:
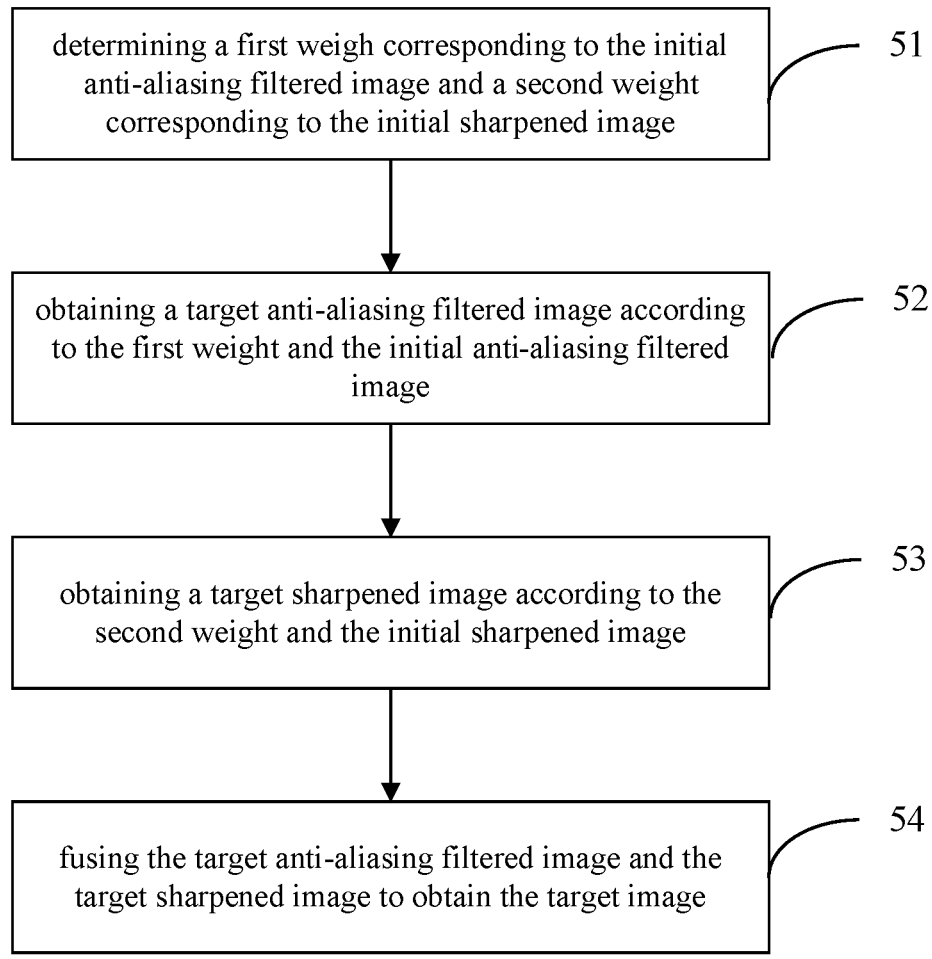
FIG. 5 is a schematic flowchart of an embodiment of image fusion provided by the embodiment of the present application.

With reference to FIG. 5, FIG. 5 is a schematic flowchart of an embodiment of image fusion provided by the embodiment of the present application, the image fusion can include:

A step 51 includes determining a first weigh corresponding to the initial anti-aliasing filtered image and a second weight corresponding to the initial sharpened image.

In particular, in an embodiment of the present application, when the anti-aliasing filtered image and the sharpened image are fused, for different pixels, the weight corresponding to the initial anti-aliasing filtered image and the weight corresponding to the initial sharpened image are different.

In some embodiments, the step of determining the first weigh corresponding to the initial anti-aliasing filtered image and the second weight corresponding to the initial sharpened image, can include: determining a maximum gradient value among the gradient values and determining a first gradient value threshold and a second gradient value threshold according to the maximum gradient value; obtaining a relationship of predetermined gradient value to weight correspondence; and determining the first weight and the second weight according to the first gradient value threshold, the second gradient value threshold, and the relationship of predetermined gradient value to weight correspondence.

In particular, because the present application determines the gradient value and the gradient direction corresponding to each pixel in the enlarged image, the gradient value is plural actually. The different gradient values have a maximum gradient value in which the value is maximal.

The present application also provides a relationship of predetermined gradient value to weight correspondence. In the relationship of predetermined gradient value to weight correspondence, when the gradient value corresponding to the sampling point are in different angle ranges, the first weight and the second weight corresponding to the sampling point are also different. Therefore, the initial anti-aliasing filtered image and the initial sharpened image to be fused are also different.

In the mean time, the embodiment of the present application also determines a first gradient value threshold and a second gradient value threshold according to the maximum gradient value. Further calculating the first gradient value threshold and the second gradient value threshold can obtain a specific weight value of the above relationship of predetermined gradient value to weight correspondence.

In a specific embodiment, maximum gradient value can be: max(G). The first gradient value threshold and the second gradient value threshold obtained according to the maximum gradient value can be:

$$E_{icor} = a*\max(G);$$

$$E_{ith} = b*\max(G);$$

wherein $E_{icor}$ is a first gradient value threshold, and $E_{ith}$ is a second gradient value threshold; values of a and b can be set at will; usually, the value of a is less than the value of b. In a specific embodiment, a can be 0.2, and b can be 0.4.

The step of determining the first weight and the second weight according to the first gradient value threshold, the second gradient value threshold, and the relationship of predetermined gradient value to weight correspondence can be:

$$E_i = \begin{cases} 0 & G \le E_{icor} \\ (G - E_{icor})/(E_{ith} - E_{icor}) & E_{icor} < G < E_{ith} \\ 1 & G \ge E_{ith} \end{cases}$$

In the above formula, $E_i$ is a weight parameter; The first weight can be $1-E_i$, second weight is $E_i$.

A step 52 includes obtaining a target anti-aliasing filtered image according to the first weight and the initial anti-aliasing filtered image.

At this time, the step obtaining a target anti-aliasing filtered image according to the first weight and the initial anti-aliasing filtered image can be:

$$(1-E_i)*I_{AAF}.$$

A step 53 includes obtaining a target sharpened image according to the second weight and the initial sharpened image.

The step of obtaining a target sharpened image according to the second weight and the initial sharpened image can be: $E_i*I_{lp}$.

A step 54 includes fusing the target anti-aliasing filtered image and the target sharpened image to obtain the target image.

At this time, the step of fusing the target anti-aliasing filtered image and the target sharpened image to obtain the target image can be:

$$I_{fusion} = (1-E_i)*I_{AAF} + E_i*I_{lp}$$

The above formula is an image fusion formula provided by the embodiment of the present application. $I_{fusion}$ is a pixel grayscale value corresponding to the fused sampling point, $(1-E_i)*I_{AAF}$ is a target anti-aliasing filtered image, $E_i*I_{lp}$ is a target sharpened image. Furthermore, the weight parameter $E_i$ needs to be determined according to the maximum gradient value in the enlarged image.

Figure 6:
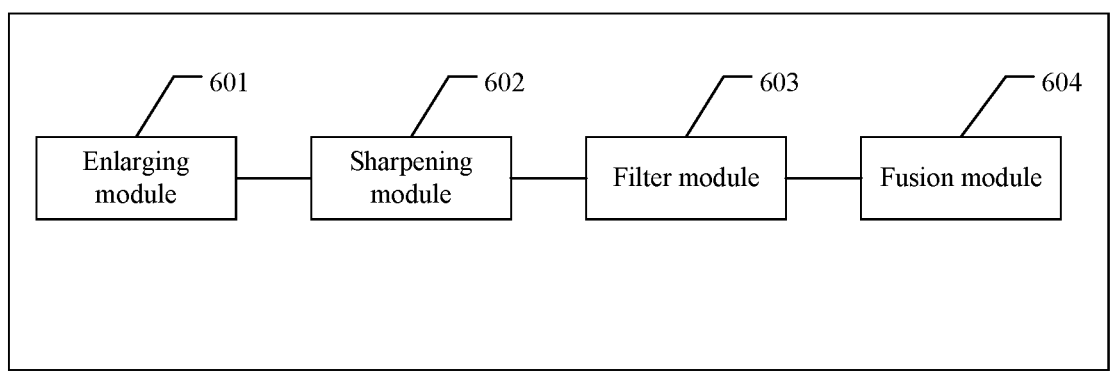
FIG. 6 is an embodiment schematic view of the image process device provided by the embodiment of the present application.

The embodiment of the present application also provides an image process device. With reference to FIG. 6, FIG. 6 is a an embodiment schematic view of the image process device provided by the embodiment of the present application, the image process device can include:

an enlarging module 601 configured to enlarging an initial image to be processed to obtain an enlarged image, and calculate a gradient value and a gradient direction corresponding to the enlarged image;

a filter module 602 configured to segmentally anti-aliasing filtering the enlarged image according to the gradient direction to obtain an initial anti-aliasing filtered image;

a sharpening module 603 configured to sharpen the enlarged image to obtain an initial sharpened image; and a fusion module 604 configured to fuse the initial sharpened image and the initial anti-aliasing filtered image to obtain a processed target image corresponding to the initial image.

The image process device provided by the embodiment of the present application includes: first, enlarging an initial image to be processed to obtain an enlarged image, and a gradient value and a gradient direction corresponding to the enlarged image is calculated; Further, segmentally anti-aliasing filtering the enlarged image according to the gradient direction to obtain an initial anti-aliasing filtered image; and sharpening the enlarged image is to obtain an initial sharpened image; finally, fusing the initial sharpened image and the initial anti-aliasing filtered image to obtain an initial image processed target image. Performing different processes to an enlarged image and then fusing a plurality of images after the different processes make the initial image experience multiple processes, which effectively mitigates sawtooth and artifacts phenomenon in the image while improving clarity of the image.

In some embodiments, the enlarging module 601 can be specifically configured to: enlarge the initial image by a bicubic linear interpolation algorithm to obtain the enlarged image; and calculate a gradient value of the enlarged image by a predetermined gradient operator and calculate a gradient direction of the enlarged image.

In some embodiments, the enlarging module 601 can be specifically configured to: calculate a horizontal gradient value of the enlarged image by a predetermined first gradient operator; calculate a vertical gradient value of the enlarged image by a predetermined second gradient operator; and calculate and obtain the gradient value of the enlarged image and the gradient direction of the enlarged image according to the horizontal gradient value and the vertical gradient value.

In some embodiments, the filter module 602 can be specifically configured to: obtain filtering operators corresponding to the gradient direction, and anti-aliasing filter the enlarged image according to the filtering operators to obtain the initial anti-aliasing filtered image; and wherein the filtering operators corresponding to the gradient direction in different angle ranges are different, and the filtering operators are plural.

In some embodiments, the sharpening module 603 can be specifically configured to: sharpen the enlarged image by a predetermined sharpening operator to obtain the initial sharpened image.

In some embodiments, the fusion module 604 can be specifically configured to: determine a first weigh corresponding to the initial anti-aliasing filtered image and a second weight corresponding to the initial sharpened image; obtain a target anti-aliasing filtered image according to the first weight and the initial anti-aliasing filtered image; obtain a target sharpened image according to the second weight and the initial sharpened image; and fuse the target anti-aliasing filtered image and the target sharpened image to obtain the target image.

In some embodiments, the gradient value is plural; the fusion module 604 can be specifically configured to: determine a maximum gradient value among the gradient values and determine a first gradient value threshold and a second gradient value threshold according to the maximum gradient value; obtain a relationship of predetermined gradient value to weight correspondence; and determine the first weight and the second weight according to the first gradient value threshold, the second gradient value threshold, and the relationship of predetermined gradient value to weight correspondence.

Figure 7:
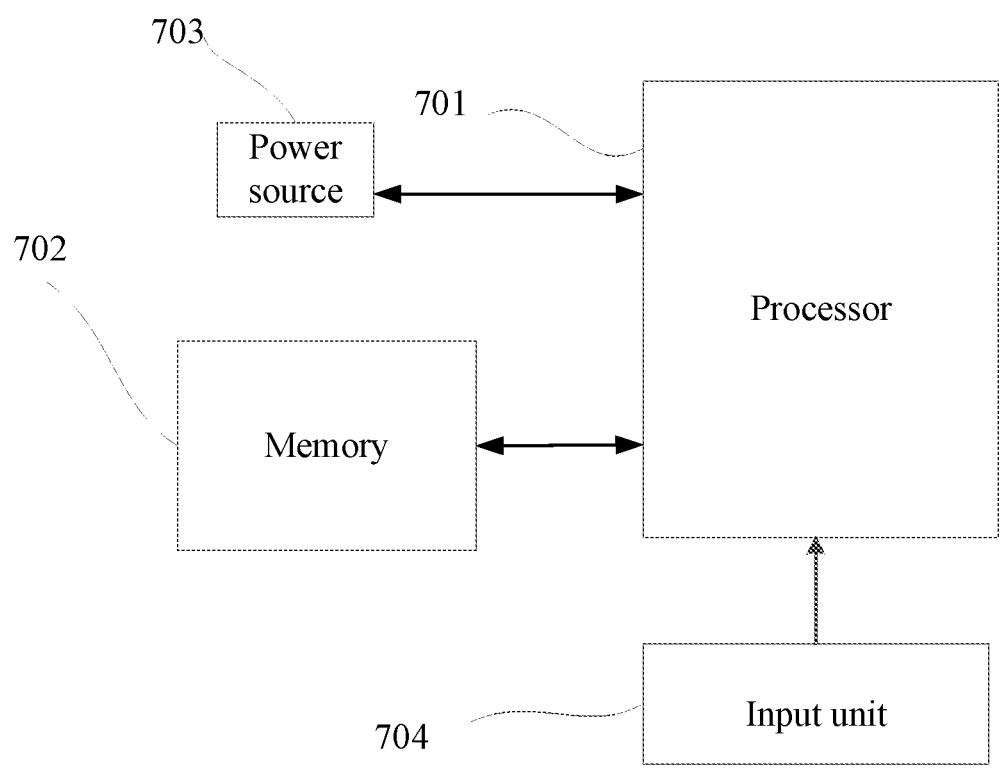
FIG. 7 is a schematic structural view of a server relating to the embodiment of the present application.

The embodiment of the present application also provides an electronic apparatus integrated with any one of the image process devices provided by the embodiment of the present application. With reference to FIG. 7, FIG. 7 is a schematic structural view of a server relating to the embodiment of the present application, and it is specifically described that:

The electronic apparatus can include at least one the processor 701 of a process core, at least one memory 702 of a computer readable storage medium, a power source 703, an input unit 704, etc. A person of ordinary skill in the art can understand that, the electronic apparatus structure shown in the figures has no limit to the electronic apparatus, more or less parts than as shown in the figures, combination of some parts or different arrangements of the parts, can be included. wherein:

The processor 701 is a control center of the electronic apparatus, uses various interfaces and lines to connect each part of the entire electronic apparatus, and implements various functions of the electronic apparatus and processes data by operating or implementing software programs and/or modules stored in the memory 702 and calling data stored the memory 702 to monitor the entire electronic apparatus. Optionally, the processor 701 can include one or a plurality of process cores. Preferably, the processor 701 can be integrated with an application processor and a modem processor, wherein the application processor is mainly configured to process an operation system, a user interface, and an application program. The modem processor is mainly configured to process wireless communication. It can be understood that the above the modem processor can be out of the processor 701.

The memory 702 can be configured to store a software program and module. The processor 701, by implementing a software program and module stored in the memory 702, implements various function applications and data processes. The memory 702 can mainly include a storage program region and a storage data region. The storage program region can store an operation system, at least one application program required by functions (for example, audio play function, image play function). The storage data region can store according to data built for utility of electronic apparatus. Furthermore, the memory 702 can include a high-speed random access memory, can further include a non-volatile memory, for example, at least one disk storage device, flash device, or other volatile solid state storage device. Accordingly, the memory 702 can further include a memory controller to allow the processor 701 to access the memory 702.

The electronic apparatus further includes a power source 703 powering each part. Preferably, the power source 703 can be logically connected to the processor 701 through a power management system such that managements of charging, discharging and power consumption management are achieved through the power management system. The power source 703 can further include any assembly such as at least one direct current or alternate current power source, recharge system, power source malfunction detective circuit, power source converter or inverter, power source state indicator, etc.

The electronic apparatus can further include an input unit 704. The input unit 704 can be configured to receive inputted digital or character message, and generate signal input of keyboard, mouse, joystick, or optical or tracking ball related to user configuration and function control.

Although not shown, the electronic apparatus can further include a display unit, which is not repeatedly described here. In particular, in the present embodiment, the processor 701 in the electronic apparatus would, according to the following instructions, loads executable files corresponding to processes of one or more application programs in to the memory 702, and the processor 701 performs the application program stored in the memory 702 to implement various functions as follows:

enlarging an initial image to be processed to obtain an enlarged image and calculating a gradient value and a gradient direction corresponding to the enlarged image; segmentally anti-aliasing filtering the enlarged image according to the gradient direction to obtain an initial anti-aliasing filtered image; sharpening the enlarged image to obtain an initial sharpened image; and fusing the initial sharpened image and the initial anti-aliasing filtered image to obtain a processed target image corresponding to the initial image.

A person of ordinary skill in the art can understand that some or all steps of each method of the above embodiment can be accomplished by instructions or by related hardware controlled by instructions. The instructions can be stored in a computer readable storage medium, and be loaded to and performed by a processor.

As such, the embodiment of the present application provides a computer readable storage medium, the storage medium can include: read only memory (ROM), random access memory (RAM), hard disc, or compact disc. A computer program is stored thereon, and the computer program is loaded to the processor to perform steps of any one of image process methods provided by the embodiment of the present application. For example, the computer program is loaded to the processor to perform the following steps:

enlarging an initial image to be processed to obtain an enlarged image and calculating a gradient value and a gradient direction corresponding to the enlarged image; segmentally anti-aliasing filtering the enlarged image according to the gradient direction to obtain an initial anti-aliasing filtered image; sharpening the enlarged image to obtain an initial sharpened image; and fusing the initial sharpened image and the initial anti-aliasing filtered image to obtain a processed target image corresponding to the initial image.

In the above-mentioned embodiments, the descriptions of the various embodiments are focused. For the details of the embodiments not described, reference may be made to the related descriptions of the other embodiments, which is not repeatedly described here.

In specific implementation, each of the above units or structures may be implemented as a separate entity, or may be any combination, and implemented as the same entity or a plurality of entities.

The specific implementation of the above units or structures refer to the previous method embodiment and will not be described repeatedly.

The image process method, device, server, and storage medium provided by the embodiment of the present application are described in detail as above. In the specification, the specific examples are used to explain the principle and embodiment of the present application. The above description of the embodiments is only used to help understand the method of the present application and its spiritual idea. Meanwhile, for those skilled in the art, according to the present the idea of invention, changes will be made in specific embodiment and application. In summary, the contents of this specification should not be construed as limiting the present application.

What is claimed is:

1. An image process method, wherein the method comprises:
    enlarging an initial image to be processed to obtain an enlarged image and calculating a gradient value and a gradient direction corresponding to the enlarged image;
    segmentally anti-aliasing filtering the enlarged image according to the gradient direction to obtain an initial anti-aliasing filtered image;
    sharpening the enlarged image to obtain an initial sharpened image; and
    fusing the initial sharpened image and the initial anti-aliasing filtered image to obtain a processed target image corresponding to the initial image;
    wherein the gradient value is plural, and the step of determining the first weigh corresponding to the initial anti-aliasing filtered image and the second weight corresponding to the initial sharpened image, comprises:
        determining a maximum gradient value among the gradient values and determining a first gradient value threshold and a second gradient value threshold according to the maximum gradient value;
        obtaining a relationship of predetermined gradient value to weight correspondence; and
        determining the first weight and the second weight according to the first gradient value threshold, the second gradient value threshold, and the relationship of predetermined gradient value to weight correspondence;
    wherein the step of determining the maximum gradient value among the gradient values and determining the first gradient value threshold and the second gradient value threshold according to the maximum gradient value, comprises:

$E_{icor} = a * \max(G);$ $E_{ith} = b * \max(G);$ wherein the maximum gradient value is max(G), the $E_{icor}$ is the first gradient value threshold, and the $E_{ith}$ is the second gradient value threshold.

2. The image process method according to claim 1, wherein the step of enlarging the initial image to be processed to obtain the enlarged image and calculating the gradient value and the gradient direction corresponding to the enlarged image, comprises:
    enlarging the initial image by a bicubic linear interpolation algorithm to obtain the enlarged image; and
    calculating a gradient value of the enlarged image by a predetermined gradient operator and calculating a gradient direction of the enlarged image.

3. The image process method according to claim 2, wherein the step of calculating the gradient value of the enlarged image by the predetermined gradient operator and calculating the gradient direction of the enlarged image, comprises:
    calculating a horizontal gradient value of the enlarged image by a predetermined first gradient operator;
    calculating a vertical gradient value of the enlarged image by a predetermined second gradient operator; and
    calculating and obtaining the gradient value of the enlarged image and the gradient direction of the enlarged image according to the horizontal gradient value and the vertical gradient value.

4. The image process method according to claim 3, wherein the step of calculating and obtaining the gradient direction of the enlarged image according to the horizontal gradient value and the vertical gradient value, comprises:
    solving a ratio of the horizontal gradient value to the vertical gradient value by a tangent or arctangent function, wherein a solving result is an angle corresponding to a gradient; and
    determining the gradient direction according to the angle.

5. The image process method according to claim 1, wherein the step of segmentally anti-aliasing filtering the enlarged image according to the gradient direction to obtain the initial anti-aliasing filtered image, comprises:
    obtaining filtering operators corresponding to the gradient direction, and anti-aliasing filtering the enlarged image according to the filtering operators to obtain the initial anti-aliasing filtered image; and
    wherein the filtering operators corresponding to the gradient direction in different angle ranges are different, and the filtering operators are plural.

6. The image process method according to claim 1, wherein the step of sharpening the enlarged image to obtain the initial sharpened image, comprises:
    sharpening the enlarged image by a predetermined sharpening operator to obtain the initial sharpened image.

7. The image process method according to claim 6, wherein the step of sharpening the enlarged image by the predetermined sharpening operator to obtain the initial sharpened image, comprises:
    a sharpening formula of sharpening the enlarged image by a predetermined Laplacian operator to obtain a sharpened image, which is as follows:

$I_{lp} = I_{bc} + G_{lp} * (S_{lp} * I_{bc})$ wherein the $G_{lp}$ is a sharpening coefficient, the $S_{lp}$ is the predetermined Laplacian operator, the $I_{bc}$ is a grayscale value corresponding to a sampling point.

8. The image process method according to claim 7, wherein the sharpening coefficient is an adjustable value, the image process method further comprises:
    adjusting a value of the sharpening coefficient $G_{lp}$ to adjust a sharpening degree of the enlarged image.

9. The image process method according to claim 1, wherein the step of fusing the initial sharpened image and the initial anti-aliasing filtered image to obtain the processed target image corresponding to the initial image, comprises:
    determining a first weigh corresponding to the initial anti-aliasing filtered image and a second weight corresponding to the initial sharpened image;
    obtaining a target anti-aliasing filtered image according to the first weight and the initial anti-aliasing filtered image;
    obtaining a target sharpened image according to the second weight and the initial sharpened image; and fusing the target anti-aliasing filtered image and the target sharpened image to obtain the target image.

10. An image process device, wherein the device comprises:
an enlarging module configured to enlarge an initial image to be processed to obtain an enlarged image and configured to calculate a gradient value and a gradient direction corresponding to the enlarged image;
a filter module configured to segmentally anti-aliasing filtering the enlarged image according to the gradient direction to obtain an initial anti-aliasing filtered image;
a sharpening module configured to sharpen the enlarged image to obtain an initial sharpened image; and
a fusion module configured to fuse the initial sharpened image and the initial anti-aliasing filtered image to obtain a processed target image corresponding to the initial image;
wherein the gradient value is plural, and the fusion module is configured to:
determine a maximum gradient value among the gradient values and determine a first gradient value threshold and a second gradient value threshold according to the maximum gradient value;
obtain a relationship of predetermined gradient value to weight correspondence; and
determine the first weight and the second weight according to the first gradient value threshold, the second gradient value threshold, and the relationship of predetermined gradient value to weight correspondence;
wherein the fusion module, configured to determine the maximum gradient value among the gradient values and determine the first gradient value threshold and the second gradient value threshold according to the maximum gradient value, comprises:

$$E_{icor}=a*\max(G);$$

$$E_{ith}=b*\max(G);$$

wherein the maximum gradient value is max(G), the $E_{icor}$ is the first gradient value threshold, and the $E_{ith}$ is the second gradient value threshold.

11. The image process device according to claim 10, wherein the enlarging module is configured to:
enlarge the initial image by a bicubic linear interpolation algorithm to obtain the enlarged image; and
calculate a gradient value of the enlarged image by a predetermined gradient operator and calculate a gradient direction of the enlarged image.

12. The image process device according to claim 11, wherein the enlarging module is configured to:
calculate a horizontal gradient value of the enlarged image by a predetermined first gradient operator;
calculate a vertical gradient value of the enlarged image by a predetermined second gradient operator; and
calculate and obtain the gradient value of the enlarged image and the gradient direction of the enlarged image according to the horizontal gradient value and the vertical gradient value.

13. The image process device according to claim 10, wherein the filter module is configured to:
obtain filtering operators corresponding to the gradient direction, and anti-aliasing filter the enlarged image according to the filtering operators to obtain the initial anti-aliasing filtered image; and
wherein the filtering operators corresponding to the gradient direction in different angle ranges are different, and the filtering operators are plural.

14. The image process device according to claim 10, wherein the sharpening module is configured to:
sharpen the enlarged image by a predetermined sharpening operator to obtain the initial sharpened image.

15. The image process device according to claim 10, wherein the fusion module is configured to:
determine a first weigh corresponding to the initial anti-aliasing filtered image and a second weight corresponding to the initial sharpened image;
obtain a target anti-aliasing filtered image according to the first weight and the initial anti-aliasing filtered image;
obtain a target sharpened image according to the second weight and the initial sharpened image; and
fuse the target anti-aliasing filtered image and the target sharpened image to obtain the target image.

16. A server, wherein the server comprises:
at least one processor;
a memory; and
at least one application program, wherein the at least one application program is stored in the memory and is configured to be implemented by the processor to perform an image process method comprising:
enlarging an initial image to be processed to obtain an enlarged image and calculating a gradient value and a gradient direction corresponding to the enlarged image;
segmentally anti-aliasing filtering the enlarged image according to the gradient direction to obtain an initial anti-aliasing filtered image;
sharpening the enlarged image to obtain an initial sharpened image; and
fusing the initial sharpened image and the initial anti-aliasing filtered image to obtain a processed target image corresponding to the initial image;
wherein the gradient value is plural, and the step of determining the first weigh corresponding to the initial anti-aliasing filtered image and the second weight corresponding to the initial sharpened image, comprises:
determining a maximum gradient value among the gradient values and determining a first gradient value threshold and a second gradient value threshold according to the maximum gradient value;
obtaining a relationship of predetermined gradient value to weight correspondence; and
determining the first weight and the second weight according to the first gradient value threshold, the second gradient value threshold, and the relationship of predetermined gradient value to weight correspondence;
wherein the step of determining the maximum gradient value among the gradient values and determining the first gradient value threshold and the second gradient value threshold according to the maximum gradient value, comprises:

$$E_{icor}=a*\max(G);$$

$$E_{ith}=b*\max(G);$$

wherein the maximum gradient value is max(G), the $E_{icor}$ is the first gradient value threshold, and the $E_{ith}$ is the second gradient value threshold.

17. The server according to claim 16, wherein the step of enlarging the initial image to be processed to obtain the enlarged image and calculating the gradient value and the gradient direction corresponding to the enlarged image, comprises:

enlarging the initial image by a bicubic linear interpolation algorithm to obtain the enlarged image; and calculating a gradient value of the enlarged image by a predetermined gradient operator and calculating a gradient direction of the enlarged image.

18. The server according to claim 17, wherein the step of calculating the gradient value of the enlarged image by the predetermined gradient operator and calculating the gradient direction of the enlarged image, comprises:

calculating a horizontal gradient value of the enlarged image by a predetermined first gradient operator;

calculating a vertical gradient value of the enlarged image by a predetermined second gradient operator; and calculating and obtaining the gradient value of the enlarged image and the gradient direction of the enlarged image according to the horizontal gradient value and the vertical gradient value.

19. The server according to claim 18, wherein the step of calculating and obtaining the gradient direction of the enlarged image according to the horizontal gradient value and the vertical gradient value, comprises:

solving a ratio of the horizontal gradient value to the vertical gradient value by a tangent or arctangent function, wherein a solving result is an angle corresponding to a gradient; and determining the gradient direction according to the angle.

20. The server according to claim 16, wherein the step of segmentally anti-aliasing filtering the enlarged image according to the gradient direction to obtain the initial anti-aliasing filtered image, comprises:

obtaining filtering operators corresponding to the gradient direction, and anti-aliasing filtering the enlarged image according to the filtering operators to obtain the initial anti-aliasing filtered image; and wherein the filtering operators corresponding to the gradient direction in different angle ranges are different, and the filtering operators are plural.

* * * * *